(12) United States Patent
Doy

(10) Patent No.: US 11,914,781 B2
(45) Date of Patent: Feb. 27, 2024

(54) USER INPUT DEVICE HAVING PIEZOELECTRIC TRANSDUCER ELECTRODE COUPLED TO TOUCH ELECTRODES

(71) Applicant: Cirrus Logic International Semiconductor Ltd., Edinburgh (GB)

(72) Inventor: Anthony S. Doy, Bend, OR (US)

(73) Assignee: Cirrus Logic Inc., Austin, TX (US)

(*) Notice: Subject to any disclaimer, the term of this patent is extended or adjusted under 35 U.S.C. 154(b) by 0 days.

(21) Appl. No.: 17/958,843

(22) Filed: Oct. 3, 2022

(65) Prior Publication Data

US 2023/0139722 A1    May 4, 2023

Related U.S. Application Data

(60) Provisional application No. 63/273,279, filed on Oct. 29, 2021.

(30) Foreign Application Priority Data

Dec. 7, 2021 (GB) ...................... 2117646

(51) Int. Cl.
*G06F 3/01* (2006.01)
*G06F 3/044* (2006.01)
*G06F 3/041* (2006.01)
*G06F 3/02* (2006.01)
*G06F 3/0354* (2013.01)

(52) U.S. Cl.
CPC ............ *G06F 3/016* (2013.01); *G06F 3/0202* (2013.01); *G06F 3/03547* (2013.01); *G06F 3/0416* (2013.01); *G06F 3/0445* (2019.05); *G06F 3/0446* (2019.05); *G06F 2203/04105* (2013.01); *G06F 2203/04106* (2013.01)

(58) Field of Classification Search
CPC ...... G06F 3/0445; G06F 3/016; G06F 3/0202; G06F 3/0416; G06F 3/0446; G06F 2203/04105
See application file for complete search history.

(56) References Cited

U.S. PATENT DOCUMENTS

| | | | | |
|---|---|---|---|---|
| 6,396,199 B1* | 5/2002 | Douglas | ................. | G10K 11/32 310/334 |
| 9,600,104 B2* | 3/2017 | Bayramoglu | ...... | H03K 17/9643 |
| 9,746,968 B1* | 8/2017 | McKown | .............. | G06F 3/0445 |
| 10,318,083 B1* | 6/2019 | McKown | ................ | G06F 3/016 |
| 10,802,651 B2* | 10/2020 | Khajeh | ................. | G06F 3/0412 |
| 11,127,547 B1* | 9/2021 | Wang | ..................... | G06F 1/1684 |
| 2012/0086651 A1* | 4/2012 | Kwon | ..................... | G06F 3/045 345/173 |

(Continued)

FOREIGN PATENT DOCUMENTS

CN          107015706 A  *  8/2017  ........... G06F 3/0414

*Primary Examiner* — Darlene M Ritchie
(74) *Attorney, Agent, or Firm* — Jackson Walker L.L.P.

(57) ABSTRACT

A touch-sensitive user input device comprising: a first electrode layer comprising a first plurality of electrodes; a second electrode layer comprising a second plurality of electrodes; an insulating layer disposed between the first electrode layer and the second electrode layer; and at least one piezoelectric transducer, wherein an electrode of the at least one piezoelectric transducer is coupled to the first plurality of electrodes of the first electrode layer.

16 Claims, 6 Drawing Sheets

(56) References Cited

U.S. PATENT DOCUMENTS

| | | | | |
|---|---|---|---|---|
| 2013/0194759 A1* | 8/2013 | Kang | ............... | G06F 3/04164 |
| | | | | 361/679.01 |
| 2013/0335371 A1* | 12/2013 | Bayramoglu | ....... | G06F 3/04144 |
| | | | | 345/174 |
| 2017/0102822 A1* | 4/2017 | Ando | ................... | H10N 30/302 |
| 2018/0081441 A1* | 3/2018 | Pedder | ............... | G06F 3/03547 |
| 2020/0401228 A1* | 12/2020 | Wen | ................... | G06F 3/04166 |
| 2021/0240268 A1* | 8/2021 | Knoppert | ............ | G06F 3/03547 |
| 2021/0373734 A1* | 12/2021 | Liu | ........................ | G06F 3/041 |
| 2022/0317805 A1* | 10/2022 | Yip | ..................... | G06F 3/04166 |

\* cited by examiner

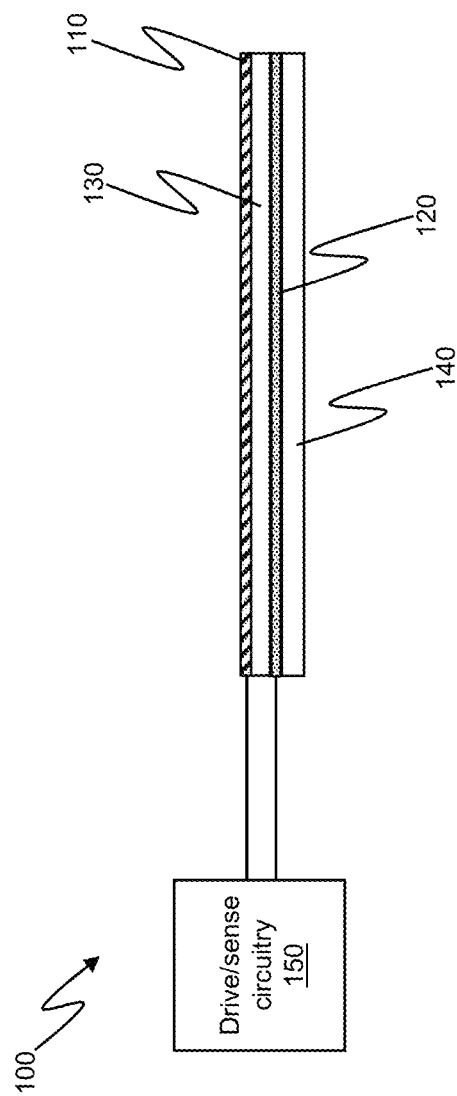

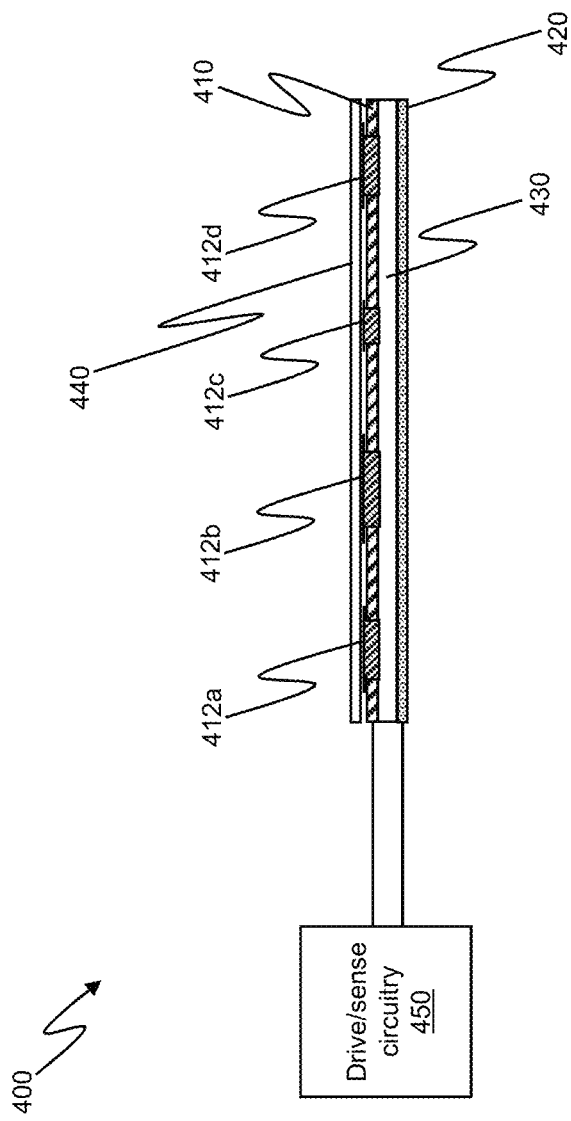

USER INPUT DEVICE HAVING PIEZOELECTRIC TRANSDUCER ELECTRODE COUPLED TO TOUCH ELECTRODES

FIELD OF THE INVENTION

The present disclosure relates to a user input device. In particular, the present disclosure relates to a touch-sensitive user input device.

BACKGROUND

Many electronic devices include a touch-sensitive user input device, either as their primary means for user input or as a secondary or additional means for user input. For example, smartphones and tablet computers typically include a touchscreen as their sole or primary means for receiving user inputs, whereas laptop computers typically include a touchpad or trackpad as a user input means, in addition to a keyboard.

FIG. 1 is a simplified cross-sectional representation of an example touch-sensitive user input device. In the illustrated example the user input device, shown generally at 100, comprises a first electrode layer 110 comprising a first plurality of electrodes, a second electrode layer 120 comprising a second plurality of electrodes, a first insulating layer 130 disposed between the first and second electrode layers 110, 120 and a second insulating layer 140 disposed beneath the second electrode layer 120. The touch-sensitive user input device 100 further comprises drive/sense circuitry 150, for supplying a drive signal to one or both of the first and second electrode layers 110, 120, and for sensing a position (e.g. x and y coordinates, relative to some origin) of a user input (e.g. a touch made with a finger, stylus or the like) on the user input device 100 by detecting a change in the capacitance of one or more of the electrodes.

The first and second insulating layers 130, 140 comprise an insulating material which is typically an optically translucent material such as glass if the touch-sensitive user input device 100 is for use in a touchscreen. If the touch-sensitive user input device is for use in a different application which does not require a screen (e.g. a track pad or the like), the second insulating layer 140 and possibly also the first insulating layer 130 may be optically opaque. In the illustrated example the first electrode layer 110 is provided on an upper surface of the first insulating layer 130 and the second electrode layer 120 is provided on an upper surface of the second insulating layer 140, though it will be appreciated that other configurations of electrode layers and insulating layers are possible.

FIG. 2a is a schematic representation of a first (e.g. upper) surface 132 of the first insulating layer 130. The first layer 110 is provided on the first surface 132 of the first insulating layer 130, and comprises, in this example, a first pattern of diamond-shaped electrodes 112 of an electrically-conductive material formed (e.g. deposited) on the first surface 132 of the first insulating layer to provide a first set of electrodes for a first axis (e.g. an x-axis) of a coordinate system for detecting the position of user inputs on the user input device. If the touch-sensitive user input device 100 is for use in a touchscreen, the first layer 110 of electrodes 112 is typically of an optically transparent or translucent and electrically conductive material such as indium tin oxide (ITO), whereas if the touch-sensitive user input device 100 is for use in a different application which does not require a screen (e.g. a track pad or the like), the first layer 110 may be of a material which is electrically conductive but need not be optically transparent or translucent.

FIG. 2b is a schematic representation of a first (e.g. upper) surface 142 of the second insulating layer 140. The second layer 120 is provided on the first surface 142 of the second insulating layer 140, and comprises, in this example, a second pattern of diamond-shaped electrodes 122 of an electrically-conductive material formed (e.g. deposited) on the first surface 142 of the second insulating layer 140 to provide a second set of electrodes for a second axis (e.g. an y-axis) of a coordinate system for detecting the position of user inputs on the user input device. Again, If the touch-sensitive user input device 100 is for use in a touchscreen, the second layer 120 of electrodes 122 is typically of an optically transparent or translucent and electrically conductive material such as indium tin oxide (ITO), whereas if the touch-sensitive user input device 100 is for use in a different application which does not require a screen (e.g. a track pad or the like), the second layer 120 may be of a material which is electrically conductive but need not be optically transparent or translucent.

FIG. 2c is a schematic representation showing the first pattern of electrodes 112 overlaid on the second pattern of electrodes 122. As will be apparent from FIG. 2c, the first and second patterns interlock, in the sense that the positions of electrodes 122 of the second pattern provided on the first surface 142 of the second insulating layer 140 coincide with gaps between electrodes 112 of the first pattern provided on the first surface 132 of the first insulating layer 130, and vice versa. Thus, the first and second patterns of electrodes 112, 122 are complementary and non-overlapping.

In use of the user input device 100, the drive/sense circuitry 150 supplies a drive signal to one of the layers, and senses the capacitance at each electrode or electrode intersection to determine the position (e.g. x and y coordinates) of a user input (e.g. a touch with a finger or stylus) on the user input device 100 based, for example, on a change in the sensed capacitance.

SUMMARY

According to a first aspect, the invention provides a touch-sensitive user input device comprising:
  a first electrode layer comprising a first plurality of electrodes;
  a second electrode layer comprising a second plurality of electrodes;
  an insulating layer disposed between the first electrode layer and the second electrode layer; and
  at least one piezoelectric transducer,
  wherein an electrode of the at least one piezoelectric transducer is coupled to the first plurality of electrodes of the first electrode layer.

The insulating layer may comprise a substrate of a printed circuit board (PCB).

The PCB may comprise a flexible PCB.

The first layer may comprise an upper conductive layer of the PCB.

The second layer may comprise a lower conductive layer of the PCB.

The first plurality of electrodes may further comprise a plurality of electrodes formed in a first pattern on the upper conductive layer of the PCB.

The second plurality of electrodes may be formed in a second pattern on the lower conductive layer of the PCB.

The first and second patterns may interlock.

The first plurality of electrodes may provide a first set of electrodes for a first axis of a coordinate system for detection of a position of a user input on the user input device, and the second plurality of electrodes may provide a second set of electrodes for a second axis of the coordinate system.

The piezoelectric transducers may be provided at spaced-apart positions in an upper portion of the touch-sensitive user input device.

The touch-sensitive user input device may comprise a keyboard having a plurality of key portions. Each key portion may be associated with a respective one of the plurality of piezoelectric transducers.

A respective one of the plurality of piezoelectric transducers may be provided beneath each key portion.

The touch-sensitive user input device may further comprise drive/sense circuitry operable to:
- sense a position of a user input on the touch-sensitive user input device based on a change in a capacitance of the first and/or second electrode layer;
- sense a force or pressure of a user input on the touch-sensitive user input device based on a signal output by the at least one piezoelectric transducer; and
- output a haptic output signal to the at least one piezoelectric transducer.

The drive/sense circuitry may be operable in a time-multiplexed fashion so as to sense the position of the user input, sense the force or pressure of the user input, and output a haptic signal in respective different phases of operation.

According to a second aspect the invention provides a host device comprising a touch-sensitive user input device according to the first aspect.

The host device may comprise, for example, a laptop, notebook, netbook or tablet computer, a mobile telephone, a portable device, or an accessory device for use with a laptop, notebook, netbook or tablet computer, a mobile telephone, or a portable device.

BRIEF DESCRIPTION OF THE DRAWINGS

Embodiments of the invention will now be described, strictly by way of example only, with reference to the accompanying drawings, of which:

FIG. 1 is a simplified cross-sectional representation of an example touch-sensitive user input device;

FIG. 3b is a schematic side view of the piezoelectric transducer of FIG. 3a;

FIG. 4 is a schematic representation of a touch-sensitive user input device according to the present disclosure;

FIG. 5b is a schematic representation of a first surface of an insulating layer of the user input device of FIG. 5a;

FIG. 5c is a schematic representation of a second surface of the insulating layer of the user input device of FIG. 5a;

FIG. 5d is a schematic representation of first and second patterns of electrodes in the user input device of FIG. 5a.

DETAILED DESCRIPTION

In many applications it is desirable to provide haptic or tactile feedback to a user of a touch-sensitive user input device, e.g. to simulate the effect of traditional user input devices such as mechanical keyboards or to provide a richer user experience. Thus, some touch-sensitive user input devices such as touchscreens are also provided or associated with haptic actuators which cause the user input device to provide haptic outputs. Typically the haptic actuators are provided in a further layer beneath the touch-sensitive user input device (e.g. below the second insulating layer 140 of the example user input device 100 of FIG. 1). As will be appreciated, however, such arrangements increase the overall thickness or height of the user input device, which is undesirable in electronic devices such as smartphones, tablet and laptop computers where the space available for the user input device is restricted.

Further, in order to determine the timing of trigger events for haptic outputs, it may be necessary for the user input device to detect the force or pressure of a received user input, in addition to the position of the received user input on the user input device. By sensing the force or pressure of a user input, an appropriate haptic response can provide a user experience, for example to simulate the sensation of pressing and releasing a switch, key or button. Providing additional force sensing circuitry may further increase the complexity of the user input device and its overall thickness or height.

Thus a desire exists for a user touch-sensitive user input device that is capable of providing haptic outputs, with a height or thickness is not significantly greater than existing touch-sensitive user input devices that do not have haptic output capabilities.

One approach to providing haptic outputs is to use one or more piezoelectric transducers which, when driven by appropriate drive signals, can be made to vibrate to produce a range of haptic effects.

Figure 3B:
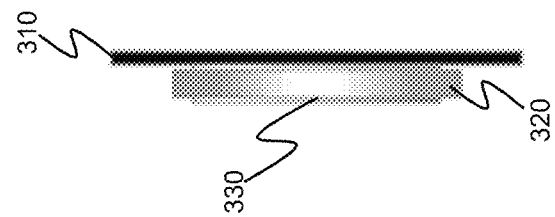
Figure 3A:
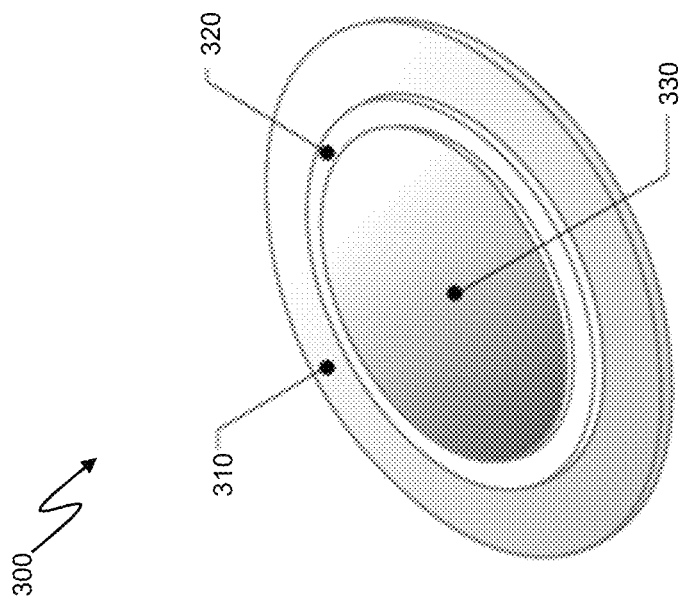
FIG. 3a is a schematic perspective representation of a piezoelectric transducer.

FIG. 3a is a schematic perspective representation of a piezoelectric transducer, and FIG. 3b is a schematic side view of the same piezoelectric transducer. As can be seen, the piezoelectric transducer 300 comprises a metal plate 310, a ceramic piezoelectric element 320 and an electrode 330 mounted to the piezoelectric element 320. By applying an appropriate drive signal to the electrode 330, the piezoelectric transducer 300 can be made to vibrate so as to produce a haptic output.

FIG. 4 is a schematic representation of a touch-sensitive user input device according to the present disclosure. The touch-sensitive user input device, shown generally at 400, comprises a first electrode layer 410 comprising a first plurality of electrodes, a second electrode layer 420 comprising a second plurality of electrodes, and an first insulating layer 430 disposed between the first and second electrode layers 210, 220. A user interaction layer 440 may also be provided, overlying the first electrode layer 410, for receiving user inputs such as touches or presses made with a finger or stylus.

Figure 2A:
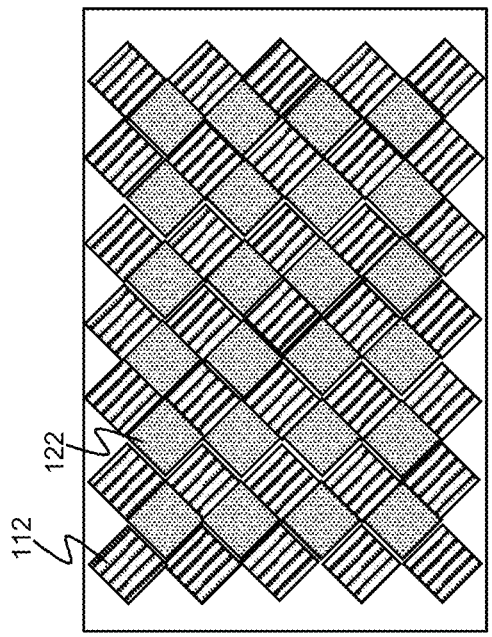
FIG. 2a is a schematic representation of a first surface of a first insulating layer of the touch-sensitive user input device of FIG. 1.
Figure 2C:
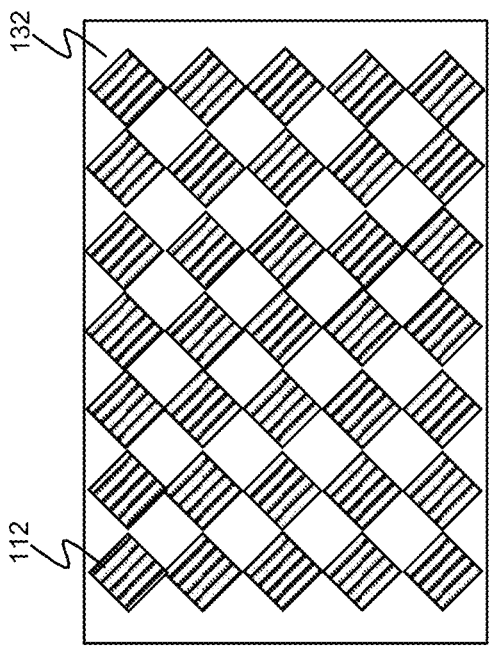
FIG. 2c is a schematic representation of first and second patterns of electrodes of the touch-sensitive user input device of FIG. 1.
Figure 2B:
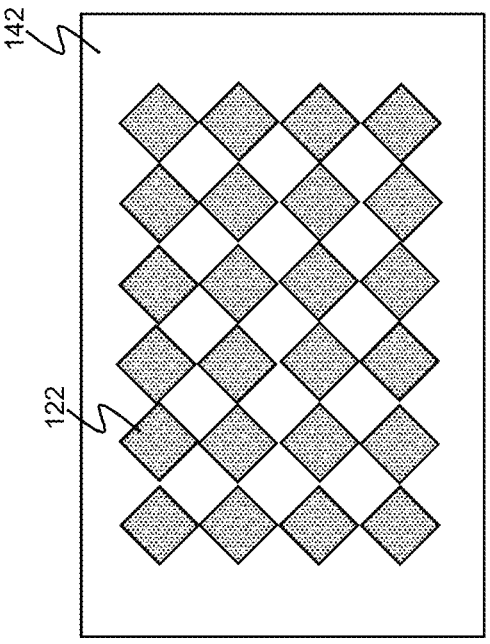
FIG. 2b is a schematic representation of a first surface 142 of a second insulating layer of the touch-sensitive user input device of FIG. 1.

The touch-sensitive user input device 400 further comprises drive/sense circuitry 450, for supplying a drive signal to one or both of the first and second electrode layers 410, 420, and for sensing a position (e.g. x and y coordinates, relative to some origin) of a user input on the user input device 400, as described above in relation to the drive/sense circuitry of the touch-sensitive user input device 200 of FIG. 2.

The insulating layer 430 in this example comprises a printed circuit board (PCB) substrate, which may be of a flexible material such as flexible polymer material, or alternatively may be a more rigid material such as FR4. In the illustrated example the first electrode layer 410 is provided on an upper surface of the insulating layer 430 and the second electrode layer 420 is provided on a lower surface of the insulating layer 430.

The user input device 400 further includes a plurality of piezoelectric transducers 412a-412d of the kind illustrated in FIG. 3. An electrode 330 of each of the piezoelectric transducers 412a-412d is coupled to the electrodes of the first electrode layer 410, such that the electrodes 330 of the piezoelectric transducers 412a-412d, form part of the plurality of electrodes of the first electrode layer 410.

In addition to sensing the position of a user input on the user input device 400 based on a change in capacitance of the first and/or second electrode layers 410, 420, the drive/sense circuitry 450 may be operative to sense a force and/or pressure of the user input on the user input device 400, based on an output signal provided by one or more of the piezoelectric transducers 412a-412d, and may also be operative to provide one or more haptic output signals to one or more of the piezoelectric transducers 412a-412d, to cause the one or more of the piezoelectric transducer(s) 412a-412d to generate a haptic output at a surface (e.g. a surface of the user interaction layer 440) of the user input device 400.

In order to perform the functions of sensing the position and force/pressure of a user input on the user input device 400 and providing a haptic output signal to one or more of the piezoelectric transducers 412a-412d, the drive/sense circuitry 450 may be operative in a time-multiplexed fashion.

In one example, the drive/sense circuitry 450 operates in a number of distinct phases, including: a first phase in which a drive signal is output to the first electrode layer 410 and the first electrode layer 410 is monitored for changes in capacitance to detect the x-coordinate position of a user input; a second phase in which a drive signal is output to the second electrode layer 420 and the second electrode layer 420 is monitored for changes in capacitance to detect the y-coordinate position of a user input; a third phase in which the piezoelectric transducers 412a-412d are monitored to detect a force/pressure of a user input based on a signal output by one or more of the piezoelectric transducers 412a-412d and, optionally, an approximate position (x and y coordinates) of a user input, again based on a signal output by one or more of the piezoelectric transducers 412a-412d; and a fourth phase in which one or more haptic output signals are output to one or more of the piezoelectric transducers 412a-412d.

In some examples the drive/sense circuitry 450 continuously cycles through the first to fourth phases at a frequency that high enough to permit output of an appropriate haptic output signal in response to a detected user input within a predefined period of time (e.g. 10 ms or another appropriate period) of detection of the position and force/pressure of the user inputs.

In other examples the drive/sense circuitry 450 may cycle continuously through the first to third phases, with the fourth phase being triggered only when the position and/or force/pressure of a user input has been detected.

Figure 5A:
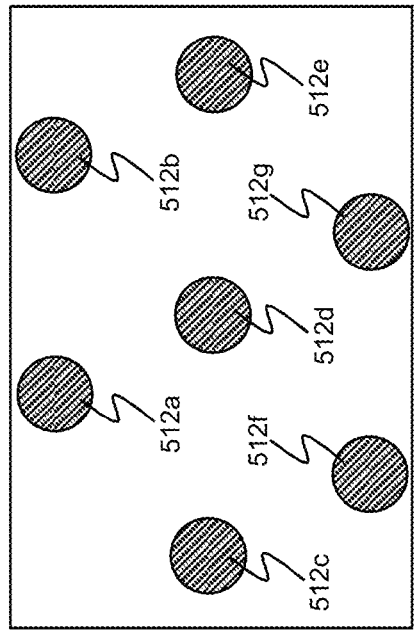
FIG. 5a is a schematic view from above a user input device of the kind shown in FIG. 4, showing the positioning of a plurality of piezoelectric transducers in an upper layer of the user input device.

FIG. 5a is a schematic view from above a user input device of the kind shown in FIG. 4, showing the positioning of a plurality of piezoelectric transducers in a portion of the user input device. As can be seen, in the example user input device 500 of FIG. 5a (which may be a touch pad, track pad, or the like), seven piezoelectric transducers 512a-512g are provided at spaced-apart positions in an upper portion, e.g. in a portion immediately below a user interaction layer. The piezoelectric transducers 512a-512g can be used to provide haptic outputs from the user input device 500, and to sense the force or pressure of a user input on the user input device 500.

Figure 5B:
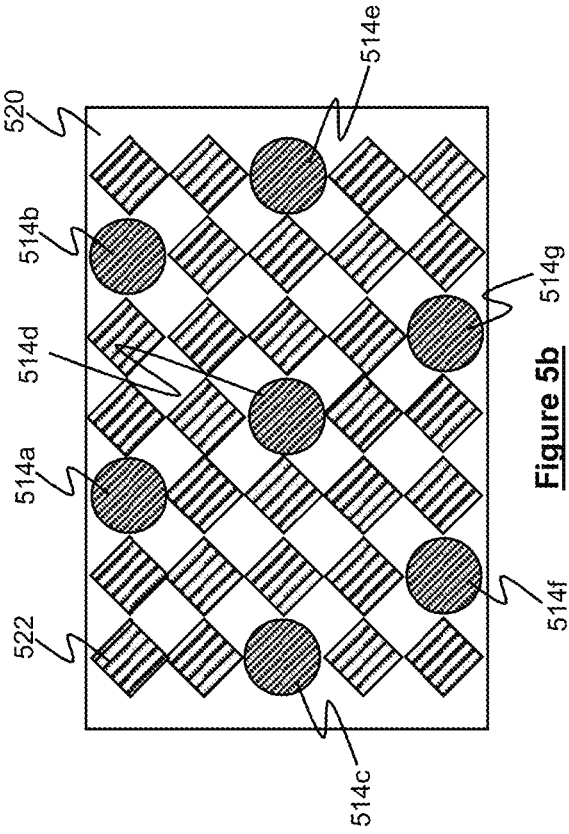

FIG. 5b is a schematic representation of a first (e.g. upper) surface 520 of an insulating layer of the user input device 500. A first electrode layer is provided on the first surface 520 of the insulating layer, and comprises, in this example, a combination of the electrodes 514a-514g of the piezoelectric transducers 512a-512g and a first pattern of diamond-shaped electrodes 522 of an electrically-conductive material such as indium tin oxide (ITO) formed (e.g. deposited) on the first surface 520 of the first insulating layer to provide a first set of electrodes for a first axis (e.g. an x-axis) of a coordinate system for detecting the position of user inputs on the user input device 500.

Figure 5C:
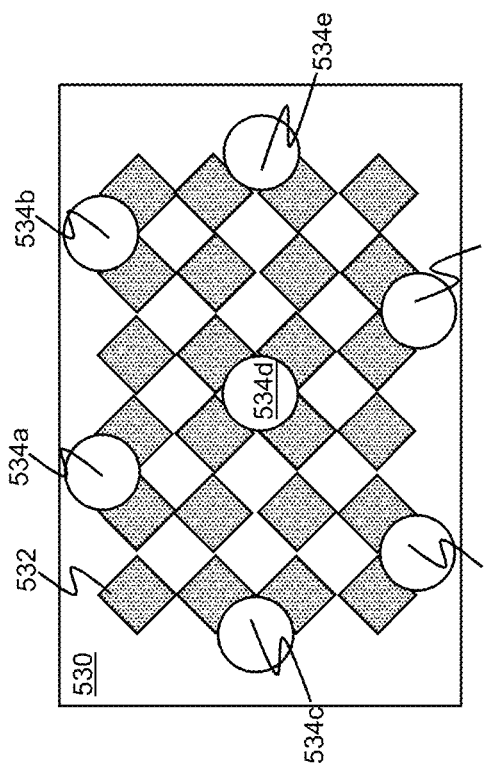

FIG. 5c is a schematic representation of a second (e.g. lower) surface 530 of the insulating layer of the user input device 500. A second electrode layer is provided on the second surface 530 of the insulating layer, and comprises, in this example, a second pattern of diamond-shaped electrodes 532 of an electrically-conductive material such as indium tin oxide (ITO) formed (e.g. deposited) on the second surface 530 to provide a second set of electrodes for a second axis (e.g. an y-axis) of a coordinate system for detecting the position of user inputs on the user input device. As can be seen in FIG. 5c, the second pattern of electrodes 532 in this example includes gaps 534a-534g to accommodate the electrodes 514a-514g of the piezoelectric transducers 512a-512g.

Figure 5D:
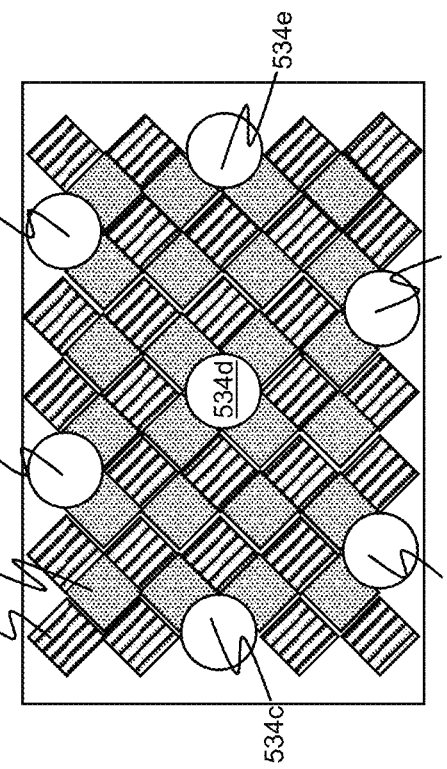

FIG. 5d is a schematic representation of the first and second patterns of electrodes 532, 534. As will be apparent from FIG. 5d, the first and second patterns interlock, in the sense that the positions of electrodes 532 of the second pattern provided on the second surface 530 of the insulating layer coincide with gaps between electrodes 522 of the first pattern provided on the first surface 520 of the insulating layer, and vice versa. Thus, the first and second patterns of electrodes 522, 532 are complementary and non-overlapping.

Thus the arrangement shown in FIGS. 4 and 5a-5d includes a plurality of piezoelectric transducers whose electrodes form part of a first electrode layer comprising a first pattern of electrodes that provides a first set of electrodes for a first axis of a coordinate system for detecting the position of user inputs on the user input device 500, and a second electrode layer comprising a second pattern of electrodes that provides a second set of electrodes for a second axis of the coordinate system.

This arrangement provides a user input device that can: i) detect the position (e.g. x and y coordinates relative to an origin) of a user input (e.g. a touch with a finger or a stylus) on the user input device 500, using the first and second electrode layers; ii) detect the force or pressure of a received user input, using the piezoelectric transducers; and iii) provide haptic or tactile feedback to the user, also using the piezoelectric transducers. As will be appreciated, as no additional layer of haptic transducers is required, the total thickness or height of the user input device is reduced, in comparison with user input devices that require an additional layer of haptic transducers for providing haptic or tactile outputs.

FIGS. 5a-5d show parts of an implementation (e.g. a touch pad or track pad) of a user interface device with a limited number of piezoelectric transducers provided at spaced apart positions in or around an upper portion (e.g. a user interaction surface) of the user input device. In other user input device implementations according to the present disclosure, a greater number of piezoelectric transducers may be provided.

For example, in a keyboard or keypad implementation, a user interaction surface may comprise a plurality of key portions (which may be delimited by markings on the user interaction surface and/or may be provided as separate discrete key portions of the user interaction surface), and each key portion may be provided or associated with a respective one of a plurality of piezoelectric transducers.

In such implementations, the first set of electrodes may be provided, at least in part, by the electrodes of the plurality of piezoelectric transducers, and the second set of electrodes may be provided by a pattern of electrodes of a conductive material such as ITO provided (e.g. printed or deposited) on a surface (e.g. a lower surface) of a substrate such as a flexible or substantially rigid PCB. In such an arrangement the electrodes of the plurality of piezoelectric transducers provide, at least in part, the first set of electrodes for the first axis of the coordinate system for detecting the position of user inputs on the user input device, and the pattern of electrodes on the substrate provides the second set of electrodes for the second axis of the coordinate system.

Figure 6:
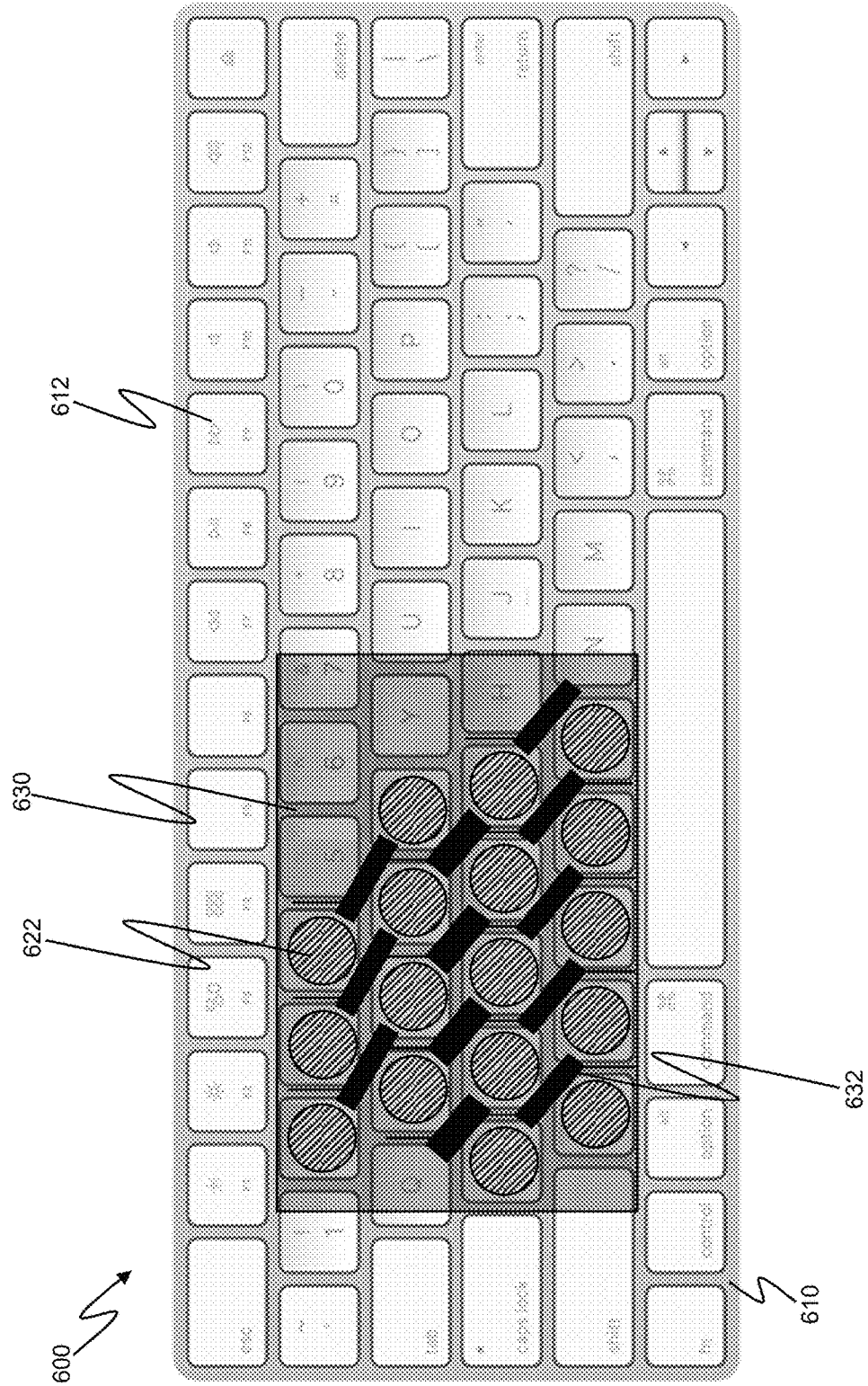
FIG. 6 is a schematic representation of a keyboard implementation of a user interface device according to the present disclosure.

FIG. 6 is a schematic illustration of an example keyboard implementation of a user input device according to the present disclosure. In the illustrated example the keyboard, shown generally at 600 in FIG. 6, comprises a user interaction layer 610 having a plurality of key portions 612 for alphanumeric keys, symbol keys, function keys, modifier keys and directional input (e.g. arrow) keys. Each key portion 612 is associated with a respective one of a plurality of piezoelectric transducers 622 (e.g. a respective one of the plurality of piezoelectric transducers 622 may be provided beneath each key portion 612) and the electrodes of the plurality of piezoelectric transducers 622 form, in conjunction with suitable coupling portions (which may be provided, for example, by conductive tracks provided on a first, e.g. upper, conductive layer of a substrate 630 such as a flexible or substantially rigid PCB), a first electrode layer providing a first set of electrodes for a first axis of a coordinate system for detecting the position of user inputs on the keyboard 600. A second electrode layer comprising a pattern of electrodes 632 is provided on another surface (e.g. a lower conductive layer) of the substrate 630, and provides the second set of electrodes for the second axis of the coordinate system.

Thus the keyboard 600 is able to detect the position of a user input on the user interaction surface 610, using the first and second electrode layers, and the force or pressure of such an input, using the piezoelectric transducers 622, and is also able to provide haptic or tactile outputs, also using the piezoelectric transducers 622.

Although not shown in FIG. 6, it will be appreciated that the keyboard 600 is also associated with drive/sense circuitry, e.g. drive/sense circuitry 450 of the kind described above with reference to FIG. 4, which is capable of sensing the position and/or force or pressure of a user input and of outputting a haptic output signal to one or more of the plurality of piezoelectric transducers 612 in order to generate a haptic output at the user interaction layer 610.

The user input device may be incorporated in a host device such as a laptop, notebook, netbook or tablet computer, a mobile telephone, a portable device, or may constitute or be incorporated in an accessory device for use with a laptop, notebook, netbook or tablet computer, a mobile telephone, or a portable device.

The skilled person will recognize that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A touch-sensitive user input device comprising:
a first electrode layer comprising a first plurality of electrodes;
a second electrode layer comprising a second plurality of electrodes;
an insulating layer disposed between the first electrode layer and the second electrode layer; and
at least one piezoelectric transducer,
wherein an electrode of the at least one piezoelectric transducer is electrically coupled to the first plurality of electrodes of the first electrode layer such that an electrode of the at least one piezoelectric transducer forms part of the plurality of electrodes of the first electrode layer, and
wherein the insulating layer comprises a substrate of a printed circuit board (PCB).

2. The touch-sensitive user input device according to claim 1, wherein the at least one piezoelectric transducer comprises a plurality of piezoelectric transducers, and wherein the plurality of piezoelectric transducers are provided at spaced-apart positions in an upper portion of the touch-sensitive user input device.

3. The touch-sensitive user input device according to claim 1, wherein the PCB comprises a flexible PCB.

4. The touch-sensitive user input device according to claim 1, wherein the first layer comprises an upper conductive layer of the PCB.

5. The touch-sensitive user input device according to claim 4, wherein the second layer comprises a lower conductive layer of the PCB.

6. The touch-sensitive user input device according to claim 5, wherein the first plurality of electrodes further comprises a plurality of electrodes formed in a first pattern on the upper conductive layer of the PCB.

7. The touch-sensitive user input device according to claim 6, wherein the second plurality of electrodes are formed in a second pattern on the lower conductive layer of the PCB.

8. The touch-sensitive user input device according to claim 7, wherein the first and second patterns interlock.

9. The touch-sensitive user input device according to claim 7, wherein the first plurality of electrodes provides a first set of electrodes for a first axis of a coordinate system for detection of a position of a user input on the user input device, and wherein the second plurality of electrodes provides a second set of electrodes for a second axis of the coordinate system.

10. The touch-sensitive user input device according to claim 1, wherein the touch-sensitive user input device comprises a keyboard having a plurality of key portions, and wherein each key portion is associated with a respective one of the plurality of piezoelectric transducers.

11. The touch-sensitive user input device according to claim 10, wherein a respective one of the plurality of piezoelectric transducers is provided beneath each key portion.

12. The touch-sensitive user input device according to claim 1, further comprising drive/sense circuitry operable to:
sense a position of a user input on the touch-sensitive user input device based on a change in a capacitance of the first and/or second electrode layer;
sense a force or pressure of a user input on the touch-sensitive user input device based on a signal output by the at least one piezoelectric transducer; and
output a haptic output signal to the at least one piezoelectric transducer.

13. The touch-sensitive user input device according to claim 12, wherein the drive/sense circuitry is operable in a time-multiplexed fashion so as to sense the position of the user input, sense the force or pressure of the user input, and to output a haptic signal in respective different phases of operation.

14. A host device comprising the touch-sensitive user input device according to claim 1.

15. The host device according to claim 14, wherein the host device comprises a laptop, notebook, netbook or tablet computer, a mobile telephone, a portable device, or an accessory device for use with a laptop, notebook, netbook or tablet computer, a mobile telephone, or a portable device.

16. A touch-sensitive user input device comprising:
a first electrode layer comprising a first plurality of electrodes;
a second electrode layer comprising a second plurality of electrodes;
an insulating layer disposed between the first electrode layer and the second electrode layer; and
at least one piezoelectric transducer,
wherein an electrode of the at least one piezoelectric transducer is electrically coupled to the first plurality of electrodes of the first electrode layer,
wherein the touch-sensitive user input device further comprises drive/sense circuitry operable to:

sense a position of a user input on the touch-sensitive user input device based on a change in a capacitance of the first and/or second electrode layer;
sense a force or pressure of a user input on the touch-sensitive user input device based on a signal output by the at least one piezoelectric transducer; and
output a haptic output signal to the at least one piezoelectric transducer.

\* \* \* \* \*